United States Patent
Mayer

[11] Patent Number: 5,819,816
[45] Date of Patent: Oct. 13, 1998

[54] PROCESS AND APPARATUS FOR METERING AND INTRODUCING A LIQUID INTO PACKAGING CONTAINERS

[75] Inventor: Werner Mayer, Wallhausen, Germany

[73] Assignee: Robert Bosch GmbH, Stuttgart, Germany

[21] Appl. No.: 513,766

[22] PCT Filed: Aug. 29, 1995

[86] PCT No.: PCT/DE94/01405

§ 371 Date: Sep. 24, 1996

§ 102(e) Date: Aug. 29, 1995

[87] PCT Pub. No.: WO95/15884

PCT Pub. Date: Jun. 15, 1995

[30] Foreign Application Priority Data

Dec. 9, 1993 [DE] Germany ............ 43 41 934.8

[51] Int. Cl.[6] ............... B65B 3/28; B65B 3/34; G01G 15/00
[52] U.S. Cl. ............... 141/83; 141/153; 141/188
[58] Field of Search ............... 141/83, 153, 188

[56] References Cited

U.S. PATENT DOCUMENTS

| 4,417,610 | 11/1983 | Waldstrom et al. ............ 141/188 |
|---|---|---|
| 5,148,841 | 9/1992 | Graffin ............ 141/83 |
| 5,156,193 | 10/1992 | Baraffato et al. ............ 141/83 |

FOREIGN PATENT DOCUMENTS

| 0086098 | 2/1972 | European Pat. Off. . |
|---|---|---|
| 0406092 | 1/1991 | European Pat. Off. . |
| 0430897 | 6/1991 | European Pat. Off. . |
| 2341136 | 9/1977 | France . |

*Primary Examiner*—J. Casimer Jacyna
*Attorney, Agent, or Firm*—Edwin E. Greigg; Ronald E. Greigg

[57] ABSTRACT

An apparatus for metering and introducing a liquid into packaging containers has a liquid-introducing device with liquid-introducing heads, which are connected to a supply container via a distributor. Arranged in the distributor are a pressure sensor, which determines a pressure (P1) prevailing in the liquid, and, if appropriate, a temperature sensor. The pressure and temperature are sensors connected to a control device to permit, together with two weighing devices, likewise connected to the control device, a precise weight regulation of a desired filling quantity (M) to be introduced into the packaging containers. The arrangement and design of the pressure and temperature sensors makes possible precise metering of the desired filling quantity (M) and simple exchange of the supply container.

7 Claims, 1 Drawing Sheet

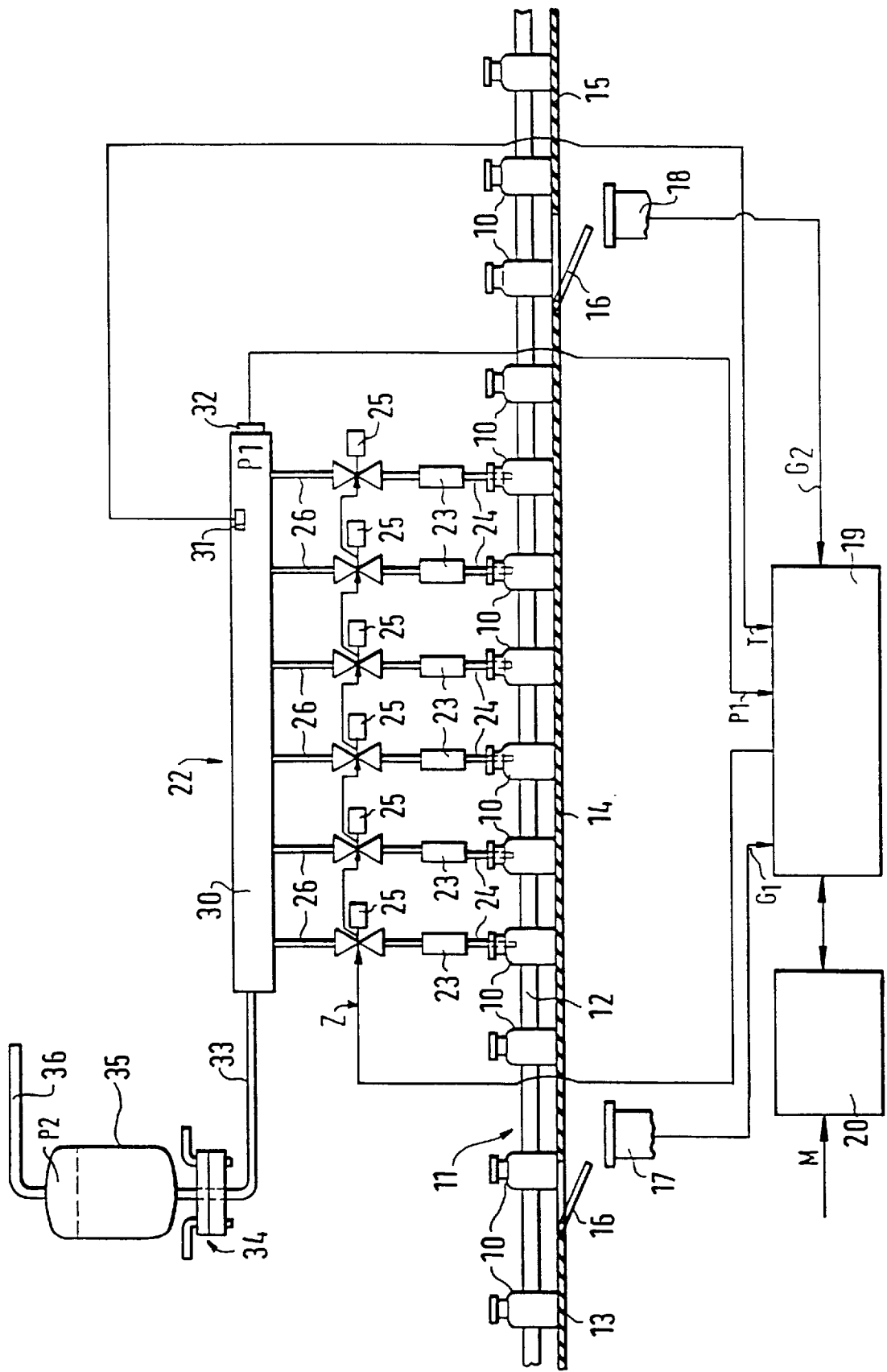

PROCESS AND APPARATUS FOR METERING AND INTRODUCING A LIQUID INTO PACKAGING CONTAINERS

PRIOR ART

The invention takes as its departure point a process for metering and introducing a liquid into packaging containers as set forth hereinafter. In a process of this type which has been disclosed in EP 0 430 897 A1, the packaging containers to be filled are conveyed to a liquid-introducing device by means of a conveying device, both the tare weight and the gross weight of the packaging containers being registered in each case by one weighing device upstream and downstream of the liquid-introducing device and being fed to a control device as an input variable. The liquid-introducing device is connected via a distributor to a supply container which stores the liquid and is subjected to a constant, regulated gas pressure. Arranged in the supply container are a sensor for registering the filling level, a sensor for registering the liquid temperature, and a sensor for registering the gas pressure, these likewise being connected to the control device. The control device determines, from the input values of the sensors and of the weighing devices, an activation time for the metering valves of the liquid-introducing device for a specific desired filling quantity. In this arrangement, a hydrostatic pressure is added to the gas pressure measured, which hydrostatic pressure, for its part, is calculated from the known density and the measured temperature of the liquid and the filling level in the supply container. At the same time, by virtue of the liquid temperature being registered, the viscosity of said liquid can be determined and the activation time of the metering valves can be corrected if appropriate. The disadvantage with the apparatus operating by this process is that all the sensors are arranged within the supply container. Upon changing the supply container, which is usually arranged exchangeably in order to use various product batches, a large amount of work is thus necessary in order to refit the sensors. Moreover, registering the liquid temperature in the supply container is problematical since the temperature, and thus also the viscosity of the liquid, can change from the supply container to the metering valves. Furthermore, in order to register the overall pressure of the liquid in the metering valves, a filling-level sensor is required in addition to a gas pressure sensor. The known apparatus is therefore of a relatively complex construction.

It is also known from the abovementioned document to dispense with the filling-level sensor when quantities to be removed from the supply container are relatively small in relation to the overall contents thereof. However, this restricts the possible applications as regards the quantities of liquid which can be removed or it produces metering inaccuracies.

U.S. Pat. No. 4,570,822 further discloses a computer-controlled metering apparatus in the case of which each metering valve is assigned its own pressure sensor in order to register the overall pressure. Furthermore, each metering valve is activated separately by a computer.

The disadvantage with this known metering apparatus is that, as a result of the large number of pressure sensors, it is of a complex construction and does not make provision for taking account of temperature.

ADVANTAGES OF THE INVENTION

In contrast, the process according to the invention for metering and introducing a liquid into packaging containers, has the advantage that, by virtue of the arrangement of the pressure sensor and, if appropriate, the temperature sensor in the immediate vicinity of the metering valves, the parameters essential for metering are registered precisely, with the result that the weight of the quantities introduced is extremely precise. Furthermore, an essential advantage is that, when a product container is changed, the sensors do not have to be exchanged or modified.

If the temperature of the liquid at the time of liquid introduction is known, then the temperature sensor can be dispensed with. Consequently, the construction of the apparatus is further simplified.

Further advantages and advantageous further developments are given herein.

BRIEF DESCRIPTION OF THE DRAWING

An exemplary embodiment of the invention is represented in the drawing, which shows a schematic view of an apparatus for metering and introducing a liquid into packaging containers, and is explained in more detail in the following description.

DETAILED DESCRIPTION OF THE EXEMPLARY EMBODIMENT

The apparatus for metering and introducing a liquid into packaging containers 10 has a conveying device 11 by means of which packaging containers 10, for example ampoules or phials, are fed to handling stations arranged one behind the other. The conveying device 11 exhibits a conveyor screw 12 for the cyclic or continuous transportation of the packaging containers 10. The packaging containers 10 stand and slide on rail pieces 13 to 15. Arranged in each case between the rail pieces 13 and 14 and 14 and 15, respectively, is a weighing device 17, 18 which can be activated via a discharge device 16 and is intended for in each case one packaging container 10, one weighing device 17 registering the tare weight G1, and the other weighing device 18 registering the gross weight G2 of the packaging container 10 and feeding said weight to a control device 19 as an input variable.

Stored in the control device 19 are, for example, product-specific data, such as the viscosity variation of the liquid over the temperature and data concerning the apparatus. Connected to the control device 19 is an input/output unit 20 via which the, in particular, one desired filling quantity M or a desired filling weight of the packaging containers 10 can be input into the control device 19.

A liquid-introducing device 22 is arranged above the conveying device 11, in the region of the rail piece 14. The liquid-introducing device 22 comprises, upon cyclic transportation of the packaging containers 10, a number, corresponding to the number of the packaging containers 10 to be filled per conveying cycle, of liquid-introducing heads 23, for example six, which each have a hollow filling needle 24 which can be moved up and down. Each liquid-introducing head 23 is coupled to in each case one metering valve 25 for the liquid, which metering valves can be activated together by the control device 19. The metering valves 25 are connected, via short lines 26, to a common, tubular distributor 30 in which a liquid pressure P1 prevails. The distributor 30 is, for its part, connected to a product supply container 35 via a line 33 and a quick-action clamping device 34. The pressure drop between the distributor 30 completely filled with the liquid and the individual metering valves 25 is always the same, for example by virtue of an arrangement of the metering valves 25 at the same vertical distance from the distributor 30.

In the supply container 35, there is advantageously located that quantity of liquid which is required for introducing into the packaging containers 10 during one production shift. This means that, during every liquid-introducing cycle, the filling level in the supply container 35 decreases only to a very small extent. The supply container 35 is subjected to a gas pressure P2 via a pressure line 36.

Advantageously, in this arrangement, the pressures P1 and P2 influence one another, with the result that P2 is regulated, for example, by the control device 19 such that a pressure P1 is always set, the tolerance of which is, for example, +/− 0.05 bar. Consequently, various arrangements of the supply container 35 on the apparatus and a falling liquid level in the supply container 35 can be compensated for.

It is, however, also possible to carry out a virtually constant regulation of the pressure P2 alone, as a result of which the pressure P1 gradually decreases with a falling liquid level. The pressure P2 generally permits a higher pressure of the liquid at the metering valves 25, and thus a high outflow speed from the supply container 35, which is favorable for the flow behavior in the case of highly viscous liquids, in particular.

Arranged in the distributor 30 are a temperature sensor 31 for registering a liquid temperature T and a pressure sensor 32 for registering the liquid pressure P1. The two sensors 31, 32 are likewise connected to the control device 19.

The abovedescribed apparatus functions as follows: The packaging containers 10 are conveyed, for example cyclically, by the conveyor screw 12 of the liquid-introducing device 22. As soon as in each case one packaging container 10 is positioned beneath its assigned liquid-introducing head 23, the filling needles 24 of the liquid-introducing heads 23 are lowered and introduced into the packaging containers 10. At the same time, by virtue of a corresponding activation of the metering valves 25 by the control device 19, the introduction of the desired filling quantity M into the packaging containers 10 begins.

In order to calculate an activation time Z for the metering valves 25 for metering the desired filling quantity M by the control device 19, both the temperature T measured by the temperature sensor 31 and the pressure P1 determined by the pressure sensor 32 are used as a basis. It is essential here that the pressure P1 measured in the vicinity of the metering valves 25 in the distributor 30 constitutes a total pressure of the liquid, comprising the gas pressure P2 and the hydrostatic pressure of the liquid column above the pressure sensor 32. Since the geometry of the apparatus, and thus also the pressure drop between the pressure sensor 32 and the metering valve 25, is known and is stored in the control device 19, a precise calculation of the activation time Z of the metering valves 25 thus takes place solely by way of the pressure value P1 and the known shape factors of the metering valves 25 and the liquid parameters. In addition, by virtue of the liquid temperature T being registered by the temperature sensor 31, the different viscosity at different temperatures T of the liquid is taken into account in the calculation of the activation time Z. If the temperature of the liquid at the time of liquid introduction is known and, in particular, is constant during one production shift, then the temperature sensor 31 may also be dispensed with.

If the desired filling quantity M, determined by the activation time Z, is introduced into the packaging containers 10, then the filling needles 24 are raised out of the packaging containers 10 again by the liquid-introducing heads 23. Thereafter, the packaging containers 10 are conveyed cyclically by the conveyor screw 12 to another processing station, for example a closure station. At the same time, the operation is repeated, as described above, for packaging containers 10 newly conveyed into the apparatus.

In order to control and/or regulate the precise metering of the liquid quantity, and thus the desired filling quantity M by the apparatus, individual packaging containers 10 are removed in the manner of a random sample via the discharge devices 16 and fed to the weighing devices 17, 18. The liquid quantity metered is calculated by the control device 19 as the difference between the gross weight G2 and the tare weight G1. In this arrangement, it is possible, with the aid of the so-called statistical process control (SPC), to determine, if defined action limits, for example the liquid quantity, but also the tare weight G1 of the packaging containers 10, are undershot or exceeded, a correspondingly corrected activation time Z by means of the control device 19.

If the supply container 35 is empty after completion of a production shift, or if a different product batch is to be used, then the apparatus can be brought into standby again by simple decoupling and coupling of another supply container 35 by means of the quick-action clamping device 34. All that is needed is for the pressure line 36 for the gas pressure P2 to be connected to the supply container 35.

The foregoing relates to preferred exemplary embodiments of the invention, it being understood that other variants and embodiments thereof are possible within the spirit and scope of the invention, the latter being defined by the appended claims.

The invention claimed and desired to be secured by Letters Patent of the United States is:

1. An apparatus for metering and introducing a liquid into packaging containers which comprises a supply container, a liquid distributor to which the liquid is directed from said supply container so as to completely fill the distributor with liquid, at least one liquid metering means (25) connected to said distributor for metering a predetermined amount of liquid into at least one liquid container, said at least one liquid metering means including at least one liquid introducing head (23) with a metering valve (25) connected directly thereto and to said liquid distributor, and a control device for actuating said liquid introducing head and said metering valve, a conveying device for conveying the package containers to a fill station and subsequent to being filled, conveying the packaging containers to a separate processing station, a first container weighing device (17) preceding said fill station to determine a tare weight, a second weighing device down stream of said filling station to weigh the filled containers, a total pressure determining means secured within said distributor for measuring a gas pressure fraction and a hydrostatic pressure fraction, to determine the total pressure of said liquid in said distributor, wherein said control device (19) determines the activation time for opening said at least one liquid metering means for feeding a quantity (M) of liquid into said container in accordance with an output signal from said control device in accordance with the different parameters of tare weight, gross weight, and total pressure of the liquid in said distributor.

2. An apparatus as claimed in claim 1, wherein the liquid-introducing means (22) has a plurality of liquid-introducing heads (23) with metering valves (25), which are activated together by the control device (19) for simultaneously filling a plurality of containers at the fill station.

3. An apparatus as set forth in claim 2, which comprises a temperature measuring means secured within said distributor for determining the temperature of the liquid in the distributor, in which a measure of the temperature is directed to said control device and is one of the parameters for determining the output signal of said control device.

4. An apparatus as set forth in claim 1, which comprises a temperature measuring means secured within said distributor for determining the temperature of the liquid in the distributor, in which a measure of the temperature is directed to said control device and is one of the parameters for determining the output signal of said control device.

5. A process for metering and introducing a liquid into packaging containers (10), comprising in the process, directing the liquid to be packaged from a supply container (35) into a distributor so as to completely fill the distributor with liquid (30) by a total pressure measuring device, determining a total pressure comprising a gas pressure fraction and a hydrostatic pressure fraction of the liquid in said distributor and feeding a value of the pressure determined into said control device as a total pressure variable, conveying the packaging containers (10) to a first weighing device (17), determining a tare weight (G1) of the packaging containers, upstream of the liquid introducing device (22), feeding a value of the tare weight determined to a control device (19) as an input variable, feeding a gross weight variable valve into said control device (19), conveying the packaging containers from the first weighing device (17) to at least one liquid-introducing filler valve of said liquid-introducing device (22) by means of said conveyor from the tare weight variable, the gross weight variable, and pressure variable directed into said control device (19), calculating in said control device a value activation time (Z) required to operate filler valves (25) in order to determine a filling quantity (M) to fill the packaging containers, activating said at least one valve for a time period (Z) to fill the containers with the proper quantity (M), and subsequent to being filled, conveying said packaging containers to a second weighing device to determine a gross weight, and then conveying the packaging containers to a processing station.

6. The process as claimed in claim 5, wherein the tare weight (G1) and the gross weight (G2) of the packaging containers (10) are registered in the manner of a random sample.

7. A process as set forth in claim 5, in which a temperature of the liquid in said distributor (30) is measured and a value of the temperature measured is directed into said control device, and the temperature value is added to the calculated value to determine a filling quantity of the packaging containers.

* * * * *